United States Patent
Lovett et al.

(10) Patent No.: US 10,636,085 B1
(45) Date of Patent: Apr. 28, 2020

(54) CONTEXTUAL GRAPHICAL USER INTERFACES

(71) Applicant: Wells Fargo Bank, N.A., San Francisco, CA (US)

(72) Inventors: Jennifer K. Lovett, Mt. Holly, NC (US); Christopher J. Terhar, Lafayette, CA (US); Mary E. Gassel, Tega Cay, SC (US); Lynn S. Douglas, Pineville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1082 days.

(21) Appl. No.: 14/851,039

(22) Filed: Sep. 11, 2015

(51) Int. Cl.
*G06Q 40/00* (2012.01)
*G06Q 40/02* (2012.01)
*G06F 3/0484* (2013.01)
*G06F 3/0482* (2013.01)

(52) U.S. Cl.
CPC ........... *G06Q 40/02* (2013.01); *G06F 3/0482* (2013.01); *G06F 3/04842* (2013.01)

(58) Field of Classification Search
USPC ............ 705/35, 40, 45, 37, 39, 38; 235/379, 235/380, 454; 715/744, 210, 760
See application file for complete search history.

(56) References Cited

U.S. PATENT DOCUMENTS

| | | | | |
|---|---|---|---|---|
| 6,014,638 | A * | 1/2000 | Burge | G06Q 30/02 705/27.1 |
| 6,170,011 | B1 * | 1/2001 | Macleod Beck | G06Q 10/06 709/224 |
| 6,185,242 | B1 * | 2/2001 | Arthur | F27B 3/16 373/72 |
| 6,867,789 | B1 * | 3/2005 | Allen | G06K 9/2054 715/744 |
| 7,721,228 | B2 * | 5/2010 | Burke | G06F 16/957 715/825 |
| 7,912,747 | B2 * | 3/2011 | Sachedina | G06Q 10/06 705/7.31 |
| 9,104,287 | B2 * | 8/2015 | Balchandran | G06F 17/247 |

(Continued)

OTHER PUBLICATIONS

I. Antović, S. Vlajić, M. Milić, D. Savić, Model and software tool for automatic generation of user interface based on use case and data model, Dec. 1, 2012, IET Software (vol. 6, Issue: 6). (Year: 2012).*

(Continued)

*Primary Examiner* — Tien C Nguyen
(74) *Attorney, Agent, or Firm* — Schwegman Lundberg & Woessner, P.A.

(57) ABSTRACT

Disclosed in some examples are methods, systems, and machine readable mediums that provide users of a network-based financial account management system with a contextual user interface element, which when activated presents dynamic graphical user interfaces that provide financial account information as well as suggested financial performance improvement actions. Whether or not the contextual user interface is displayed may be based upon one or more of: a context of the user, financial account information of the user, and account rules. Additionally, the suggested financial performance improvement actions may also be determined based upon one or more of: a context of the user, financial account information of the user, and account rules.

21 Claims, 4 Drawing Sheets

(56) References Cited

U.S. PATENT DOCUMENTS

| | | | | |
|---|---|---|---|---|
| 2002/0120543 | A1* | 8/2002 | Brittingham | G06Q 10/10 705/36 R |
| 2002/0194039 | A1* | 12/2002 | Bhaskaran | G06Q 10/06 705/7.31 |
| 2007/0078785 | A1* | 4/2007 | Bush | G06Q 20/3821 705/72 |
| 2011/0107243 | A1* | 5/2011 | Jain | G06F 8/36 715/762 |
| 2012/0180071 | A1* | 7/2012 | Lesandro | G06Q 10/06 719/313 |

OTHER PUBLICATIONS

Hongzhi Song, Yu Qi, Xuhong Tian, Dongfeng Xu, Navigating and visualizing long lists with fisheye view and graphical representation, May 12, 2008, Second Workshop on Digital Media and its Application in Museum & Heritages (DMAMH 2007) (pp. 123-128). (Year: 2008).*

* cited by examiner

CONTEXTUAL GRAPHICAL USER INTERFACES

TECHNICAL FIELD

The present application relates generally to data processing systems and, in one specific example, to techniques for providing customized graphical user interface displays based upon user context and account information.

BACKGROUND

Graphical user interfaces may be provided to users of a network-based system through a browser, a dedicated application, or a dedicated device. These graphical user interfaces typically are not provided to users based upon the context of the user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Network-based financial account management systems allow users to view, edit, modify, or otherwise control their financial accounts (e.g., bank accounts) through a network using a graphical user interface. These graphical interfaces may be provided to users for display on their computing devices (e.g., their personal computers or mobile devices such as smart phones) through a dedicated application or a web browser running on those computing devices. In other examples, the graphical user interfaces may be provided to graphical user interfaces on dedicated hardware such as an automated teller machine (ATM). Most network-based financial account management systems utilize static, pre-planned graphical user interfaces that simply fill in account details into predetermined positions on the screen. These are inflexible and fail to provide the user with personalized information.

Disclosed in some examples are methods, systems, and machine readable mediums that provide users of a network-based financial account management system with a contextual user interface element, which when activated presents dynamic graphical user interfaces that provide financial account information as well as suggested financial performance improvement actions. Whether or not the contextual user interface is displayed may be based upon one or more of: a context of the user, financial account information of the user, and account rules of the network-based financial account management system. Additionally, the suggested financial performance improvement actions may also be determined based upon one or more of: a context of the user, financial account information of the user, and account rules.

As an example, a user may log into a graphical user interface provided by the network-based financial account management system using a unique identifier and authentication credentials. The graphical user interface may be provided over a network to a computing device of the user, or may be provided through a dedicated hardware platform provided for use by the user by the network-based financial account management system (e.g., an ATM). The system may utilize the authentication credentials to verify that the user is authorized to access account details of the unique identifier. If the user is authorized, the user may be presented with account details and navigational functions to navigate the graphical user interface. While the user is interacting with the network-based financial account management system, the system may determine that one or more of the context of the user, financial account information of the user, and account rules of the network-based financial account management system indicates that the contextual user interface element is to be displayed. In some examples, the contextual user interface element may be a "show me my rate" button. If the contextual user interface is to be provided, the user may be presented with a "show me my rate" button at various points in their interaction with the network-based financial account management system.

The button, when activated by a user (e.g., by being pressed), may cause a display of financial account information—for example, a current interest rate of one or more accounts of the user managed by the network-based financial account management system. In some examples, the interest rate shown when the contextual user interface control is activated may be for a different account of the user than an account currently accessed by a user in the graphical user interface, in other examples, the interest rate shown may be for a same account of the user than an account currently accessed by a user.

During the interaction (or a different interaction), the network-based financial account management system may also provide to the user one or more user-specific and contextually based suggested financial performance improvement actions. For example, the system may provide recommendations on actions the user can take to increase their interest rate on one or more of their accounts (e.g., transfer funds to the account to put the user in the next interest rate tier). Example recommendations may include financial transfers, promotional rates, and the like. The system may also show a user interface element that, when activated, takes the user to a graphical user interface in which they may carry out the suggested action.

The graphical user interfaces described herein may be displayed through one or more computing devices, including desktop computing devices, mobile computing devices, mobile phones, ATMs, and the like. The graphical user interface can be provided as part of a web-page, or in a separate application (e.g., a mobile application downloaded from an app store) which utilizes information sent over a network (e.g. the internet) to at least partially provide a graphical user interface of the network based financial account management system.

The circumstances in which the contextual user interface element appears may be contextual to the user of the network-based financial account management system and may depend on one or more of the financial account information of the user, the user's contextual information and account rules. For example, the user interface element may appear on certain user interfaces of the network-based financial account management system, when performing certain actions (e.g., a balance transfer), or the like. The circumstances in which the user interface element appears may be predetermined by an administrator of the network-based financial account management system. The administrator may determine a series of rules (e.g., if-then statements) that determine when the contextual user interface element is shown based upon one or more of the financial account information, contextual information, and account rules.

In other examples, whether to display the contextual user interface element may be decided based upon a machine learning algorithm which may factor in one or more of: the users financial account information, account rules, the user's context, and/or other factors to determine whether to present the user interface element. For example, the user interface element may be presented only when the system predicts (e.g., through the machine learning algorithm) that the user has a high probability (e.g., over a certain threshold) of activating the user interface element.

As noted, to determine whether to show the contextual user interface element, the system may factor in the user's account information, account rules, and contextual information. A user's account information may include demographic information such as name, age, account balances, current interest rates, types of accounts the user has, a user's credit score, and the like.

In an example, account rules determine rules for accounts managed by the network based financial account management system. Example account rules include rate tiers and the qualifications for each, qualifications necessary to receive offers for promotional interest rates, and the like.

Contextual information may describe a current situation of the user and may include information on the current state (e.g., the current screen or functionality being accessed) of the graphical user interface of the network-based financial account management system the user is viewing, the accounts the user is accessing, the type of device the user is using, the user's physical location, the time of day, the transaction the user was performing, and the like.

The account parameters shown as a result of activation of the contextual user interface element may include any parameter of the customer's account not currently displayed on the graphical user interface. For example, one or more of an interest rate of an interest bearing account of the user, a mortgage interest rate, savings goals, financial performance of one or more stocks or bonds, or the like. As already noted, the information shown may be for the account the user is accessing or another account owned or managed by the user. In some examples, an ATM may display a "show me my rate" contextual user interface element, that when activated, shows an interest rate of an account of the user when the user is withdrawing money.

As already noted, the system may also show one or more suggested financial performance improvement actions to the user. In some examples, the suggested financial performance improvement actions may be any action that the user may take to improve the financial performance of accounts held with the network-based financial account management system. Example suggested financial performance improvement actions may include actions to change a parameter of the customer's account. For example, actions that a user may take to increase an interest rate of one or more of their financial accounts, such as transfers of additional amounts from a first account to a second account to move the user from a lower rate tier to a higher interest rate tier. Other actions may include setting up automatic transfers of amounts from a first account to a second account to meet one or more financial goals the user has. Recommendations to setup financial goals, offers for one or more new financial products, offers for discount promotional rates, and the like.

Figure 1:
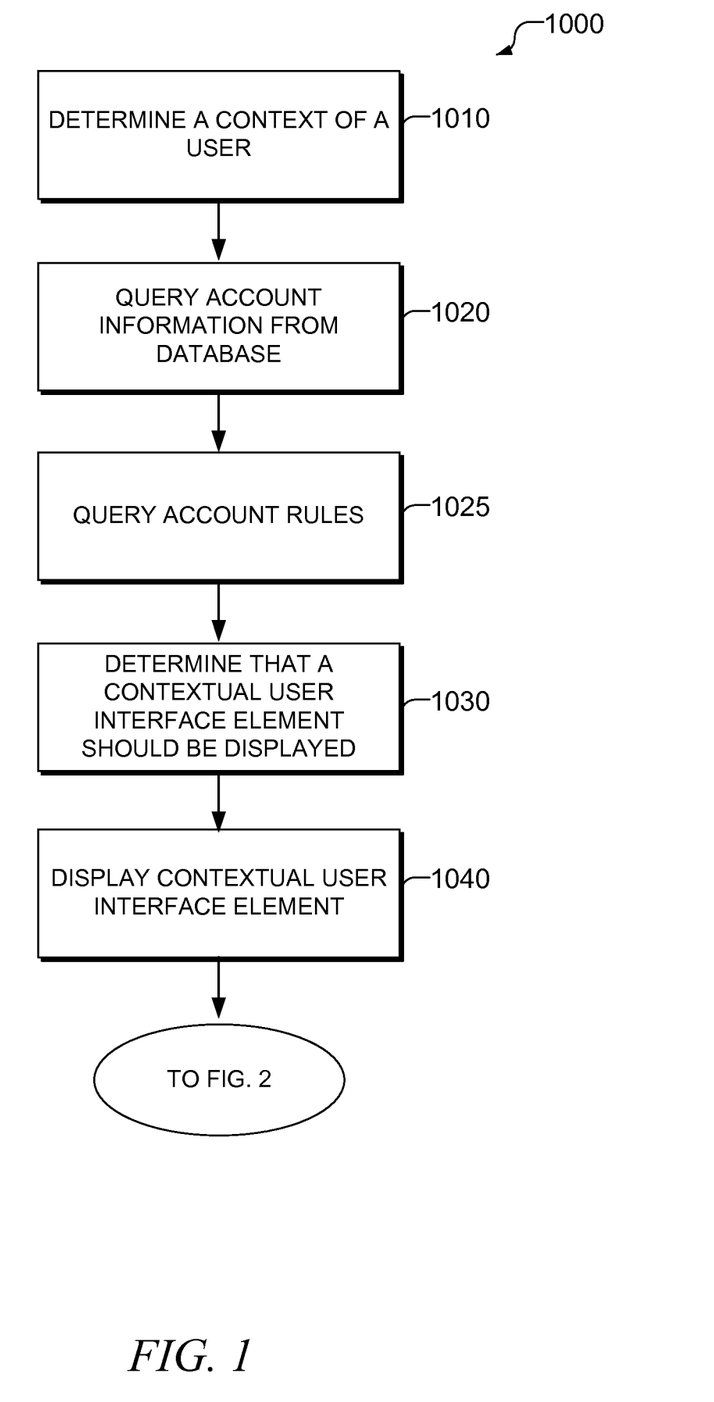
FIG. 1 is a schematic of a method of providing a contextual user interface element in a graphical user interface according to some examples of the present disclosure.

Turning now to FIG. 1, a schematic of a method 1000 of providing a contextual user interface element in a graphical user interface according to some examples of the present disclosure is shown. At operation 1010 the network-based financial account management system may determine a current context of the user. Contextual information may describe a current situation of the user and may include information on the current state (e.g., the current screen or functionality being accessed) of the graphical user interface of the network-based financial account management system, the accounts the user is accessing, the type of device the user is using to access the graphical user interface, the user's physical location, the time of day, the transaction the user was performing, and the like.

At operation 1020, financial account information may be queried from a database of the financial account management system. As already noted, financial account information may also be factored into the context determination. Financial account information may include demographic information such as name, age, physical location; and financial information such as account balances, current interest rates, product rate tiers, account flags (e.g., if the account is already receiving a promotional rate), financial products subscribed to, goals in an online financial planning tool, and the like.

At operation 1025, the system may query account rules from the network-based financial account management system. For example, what savings tiers earn which interest rates and the requirements for each tier, promotional interest rates and their requirements, and the like. To obtain the account rules, the system may communicate with one or more databases of the network-based financial account management system. An example rule may be that accounts with balances below a first threshold earn a first interest rate, and accounts above the first threshold earn a second interest rate that is higher than the first interest rate.

At operation 1030 the system may determine that a contextual user interface element should be displayed to the user. This determination may be made by utilizing one or more of the contextual and financial account information of the user and the account rules as inputs into predetermined rules (e.g., if-then statements) that determine whether or not the user should be presented with the contextual user interface element. For example, if the user is interacting with a particular graphical user interface display of the network-based financial account management system and has an interest bearing account, the system may determine that a "show me my rate" button should be displayed.

In other examples, rather than if-then rules, the determination on whether the contextual user interface should be displayed may be made based upon a machine-learned model. Example machine-learned models include a decision tree. A decision tree utilizes a tree-like graph or model of decisions, that when traversed, leads to a decision of whether to display the contextual user interface element. Each level of the decision tree may utilize information about the user's context and/or financial account information to reach the decision. Example algorithms for creating a decision tree include Iterative Dichotomiser 3 (ID3), C4.5, Classification and Regression Tree (CART), and the like.

These algorithms may depend upon training data sets. These training data sets may be initially formed manually by classifying pre-existing vectors of [user, feature data] where feature data includes one or more of: [user contexts, account information, and account rules] into positive (e.g., yes—show the contextual user interface element) and negative (e.g., no—do not show the contextual user interface element) training groups. Once the model is built and running, the training set may be further optimized based upon feedback from users. Vectors of [user, feature data] from those who select the contextual user interface element are placed in the positive set, and vectors of [user, feature data] from those who do not select the contextual user interface element are placed in the negative set. The model may then be "relearned" based upon the previous training information plus the newly learned information.

Other machine learning algorithms may include linear regression. In this method, one or more of: contextual, financial account information, and account rules for a user are mapped into a feature vector. Linear regression is used to learn a weighting for each of the dimensions of the feature vector. Each user is then scored by calculating the dot product of the feature vector and the weighting vector. The contextual user interface element is then displayed if the score is above a predetermined threshold.

At operation 1040, responsive to determining that a contextual user interface element should be displayed, the system may display the contextual user interface element. The contextual user interface element may be a button, drop down menu, hyperlink, input box, touch input control, or the like. The contextual user interface element may be placed in the currently displayed graphical user interface or may be displayed in a separate graphical user interface (e.g., a pop-up window).

Figure 2:
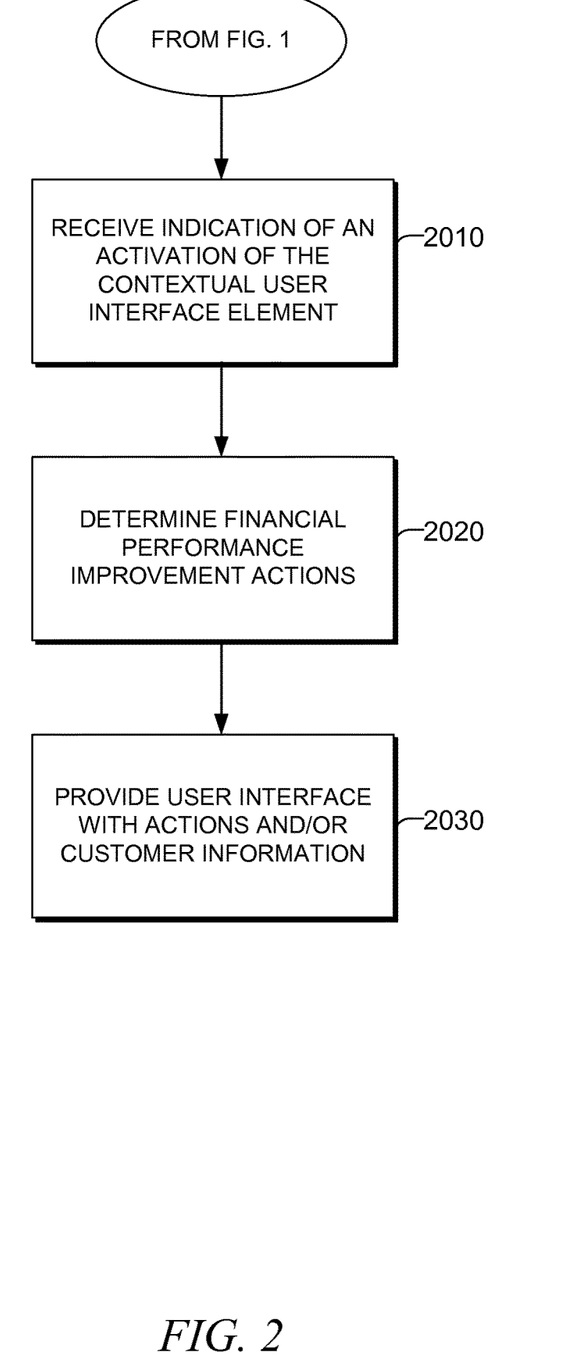
FIG. 2 is a schematic of a method of providing a graphical user interface with actions and/or user information according to some examples of the present disclosure.

Turning now to FIG. 2, and continuing from FIG. 1, at operation 2010, the system may receive an indication of an activation of the contextual user interface element. For example, if the contextual user interface element is a button, the user may activate it by clicking or tapping on it.

At operation 2020, responsive to receiving the indication of an activation of the contextual user interface element, the system may determine one or more suggested financial performance improvement actions. For example, some savings accounts determine interest rates based upon tiers that are determined based on the amount of money in the savings account. For example, if the amount of money in the savings account is between $10,000 and $50,000, then the account earns 2% interest, but if the amount is between $50,001 and $100,000 then the account earns a 2.5% interest rate. If the user's savings account is within a predetermined threshold of qualifying for a higher interest rate, the system may recommend the user deposit more money to the savings account to qualify for the increased rate.

The suggested financial performance improvement actions may be determined using a number of automated techniques. For example, a predetermined series of if-then statements may determine which of a number of predetermined financial performance improvement actions may be suggested based upon one or more of the user's financial account information, the user's contextual information, and account rules for the network-based financial account management system.

For example, if the user's savings balance is within a predetermined amount of being in a next rate tier, the system may recommend increasing the balance such that the account moves into the next rate tier. Another example is determining if the user is already on a promotional interest rate. If the user is not already on a promotional interest rate, and the user qualifies for the promotional rate, then offer the user a promotional interest rate, otherwise if the user is already on a promotional interest rate, do not offer them a promotional interest rate. As yet another example, if the user has financial goals inputted through a financial savings planning interface of the network based financial account management system, the system may suggest one or more actions that put the user on a path toward reaching one or more of those financial goals. In still other examples, the system may recommend automatic transfers from one account into another account.

In some examples, the system may have sets of these if-then rules that may be prioritized, such that if a user meets the requirements to display more than one financial performance recommendation, the financial performance recommendation that is given the highest priority is displayed before other financial performance recommendations. Additionally, the prioritization may be dynamic. For example, if a user is shown a financial performance recommendation, the priority for that financial performance recommendation may be reduced so that the next time the user is shown a financial performance recommendation it will be different. In other examples, priorities may be adjusted based upon a total number of users that have received the financial performance recommendation. Thus, if a particular financial performance recommendation has been shown over a threshold number of times to users, the particular financial performance recommendation may be de-prioritized so as to ensure that the suggested financial performance actions rotate sufficiently and remain fresh with users.

In other examples, the information about the context, account information of the user, and the account rules (determined in operations 1010 and 1020) may be input into a model which then outputs one of a predetermined list of financial performance recommendations. The model may be a classification decision tree in which the system classifies the user into one of several groups. Each group has an associated set of one or more recommendations. Decision trees may be built using algorithms such as Iterative Dichotomiser 3, C4.5, Classification and Regression Tree (CART), Chi-squared Automatic Interaction Detector (CHAID), MARS.

In other examples, other models may be utilized, such as linear regression, support vector machines, and the like to build a model which describes an affinity between a user (based upon the information gathered in 1020) and a recommendation from a predetermined list of recommendations.

In the machine learning examples, the models may be built using positive and negative training examples. These examples may be built, initially, by manually labelling [user, features, suggested financial performance improvement action] vectors where the features comprise one or more of: context information, account rules, and financial account information. These vectors may be labeled as either positive (yes, recommend this user this particular action) or negative (do not recommend this user this particular action). In some examples, once the initial model is constructed, feedback from users may be utilized. The system may retrain the model using additional examples where additional positive examples are created from instances where the member took the recommended action, and negative examples may be where the member did not take the recommended action. In these examples, the system learns over time from explicit feedback from members which members have an affinity to different recommendations.

At operation 2030 the system may provide a graphical user interface with the suggested financial performance improvement actions and/or financial account information. The graphical user interface may also have a call to action, a user interface element that allows the user to initiate the recommended action. For example, a user interface element that allows the user to initiate the transfer funds, setup an automatic transfer or withdrawal, take them to a financial planning site, or the like.

Figure 3:
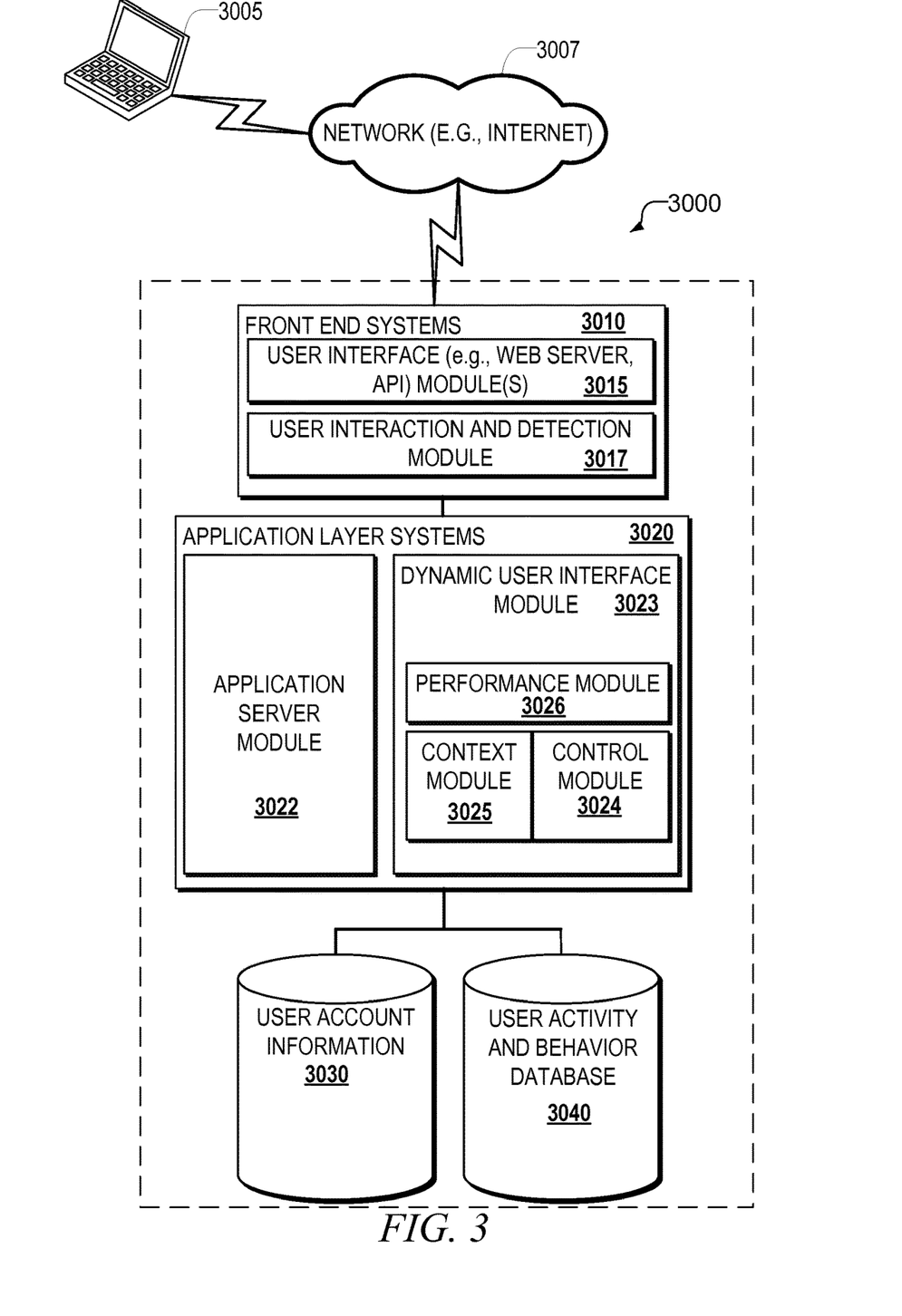
FIG. 3 is a block diagram of a network based financial account management system.

FIG. 3 illustrates a block diagram of an example network-based financial account management system 3000. As shown in FIG. 3, the network-based financial account management system may contain one or more systems, such as front end systems 3010, and application layer systems 3020. Network-based financial account management system 3000 may also include various data stores, such as a user account information database 3030 and user activity and behavior database 3040. Each system may execute on independent computing devices or may execute on the same computing devices. Front end systems 3010, application layer systems 3020 and the databases 3030 and 3040 may be communicatively coupled to each other.

Front end systems 3010 may comprise a user interface module (e.g., a web server) 3015, which receives requests from various client-computing devices (such as client device 3005) over a network, such as network 3007, and communicates appropriate responses to the requesting client devices. For example, the user interface module(s) 3015 may receive requests in the form of Hypertext Transport Protocol (HTTP) requests, or other network-based, application programming interface (API) requests (e.g., from a dedicated application running on a client device). In addition, a user interaction and detection module 3017 may be provided to detect various interactions that users have with different applications, services and content presented. For example, the user interaction and detection module 3017 may determine and save contextual information of the user.

As shown in FIG. 3, upon detecting a particular interaction, the member interaction and detection module 3017 may log the interaction, including the type of interaction and any meta-data relating to the interaction, in the user activity and behavior database 3040. For example, a context of the user may be stored in the user activity and behavior database 3040.

Application layer systems 3020 may include one or more various application server modules 3022, which, in conjunction with the user interface module(s) 3015, generate various graphical user interfaces (e.g., web pages) with data retrieved from various data sources. With some embodiments, application server module 3022 is used to implement the functionality associated with various applications and/or services provided by the network based financial account management system. Example functionality includes security (authenticating users), providing financial account information as part of a graphical user interface, executing financial transactions (balance transfers, financial transfers), closing accounts, opening accounts, setting financial goals, determining interest rates, and the like.

Application layer systems 3020 may also include a dynamic user interface module 3023 which may be responsible for implementing the operations of FIGS. 1 and 2. Dynamic user interface module 3023 may include a control module 3024 which may track users of the network based financial account management system and may periodically call the context module 3025 to determine if it is appropriate to present a context based user interface control.

Context module 3025 may determine, based upon the user's current context and financial account information whether to display a contextual user interface element. As previously explained, this may be based upon one or more rules that evaluate the contextual information, account rules, and financial account information. In other examples, automated machine-learned algorithms may be utilized which predict whether a user is likely to engage with the context based user interface element based upon one or more of the user's account information and contextual information, and account rules of the network-based financial account management system. In these examples, context module 3025 may create and build the model. Context module 3025 may retrieve context information of a user from one or more of: user activity and behavior database 3040, application server module 3022, user interaction and detection module 3017, and user interface module 3015.

Upon receiving a determination that a contextual user interface element should be displayed, the control module 3024 may cause the contextual user interface element to be displayed. The control module 3024 may send a message to application server module 3022, or one of the front end systems 3010 to include the contextual user interface element in a graphical user interface presented to the user.

Upon receiving an indication from one of the front end systems 3010 and application server module 3022 that the user has activated the contextual user interface element, the control module 3024 may query user account information database 3030 to determine the account information to present to the user. Control module 3024 may also query the performance module 3026 for one or more suggested financial performance improvement actions. The network-based financial account management system may then provide a graphical user interface with the information and suggested financial performance improvement actions. The graphical user interface may be provided by constructing one or more graphical user interface descriptors. Example graphical user interface descriptors may include HTML or other web-content that may be rendered by a browser, or one or more pieces of data that allows an application executing on the computing device 3005 to display a graphical user interface. Users may also be provided a button or other input element to take the suggested financial performance improvement actions. These input elements link to the application server module 3022 to take the desired action.

User account information database 3030 may include user's account information including user demographics information and account information. User account information database 3030 may also store account rules for the network-based financial account management system. Consistent with some embodiments, when a person initially registers for a financial account managed by the network-based financial account management system, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, and so on. This information is stored, for example, in the user account information database 3030. Similarly, information on types of accounts, account rules, interest rates, accounts the user has, balances, and the like are also stored in the user account information database 3030. Additionally, rules related to various types of accounts (e.g., promotional rules, interest rate tiers, and the like) are stored in user account information 3030 database.

With some embodiments, the network-based financial account management system 3000 provides an application programming interface (API) module with the front end systems 3010 via which applications and services can access various data and services provided or maintained by the network-based financial account management system 3000. Such applications may be browser-based applications, or may be operating system-specific. In particular, some applications may reside and execute (at least partially) on one or more mobile devices (e.g., phone, or tablet computing devices) with a mobile operating system. In other examples an ATM may utilize an API to obtain information about a user. Furthermore, while in many cases the applications or services that leverage the API may be applications and services that are developed and maintained by the entity operating the network-based financial account management system 3000.

Figure 4:
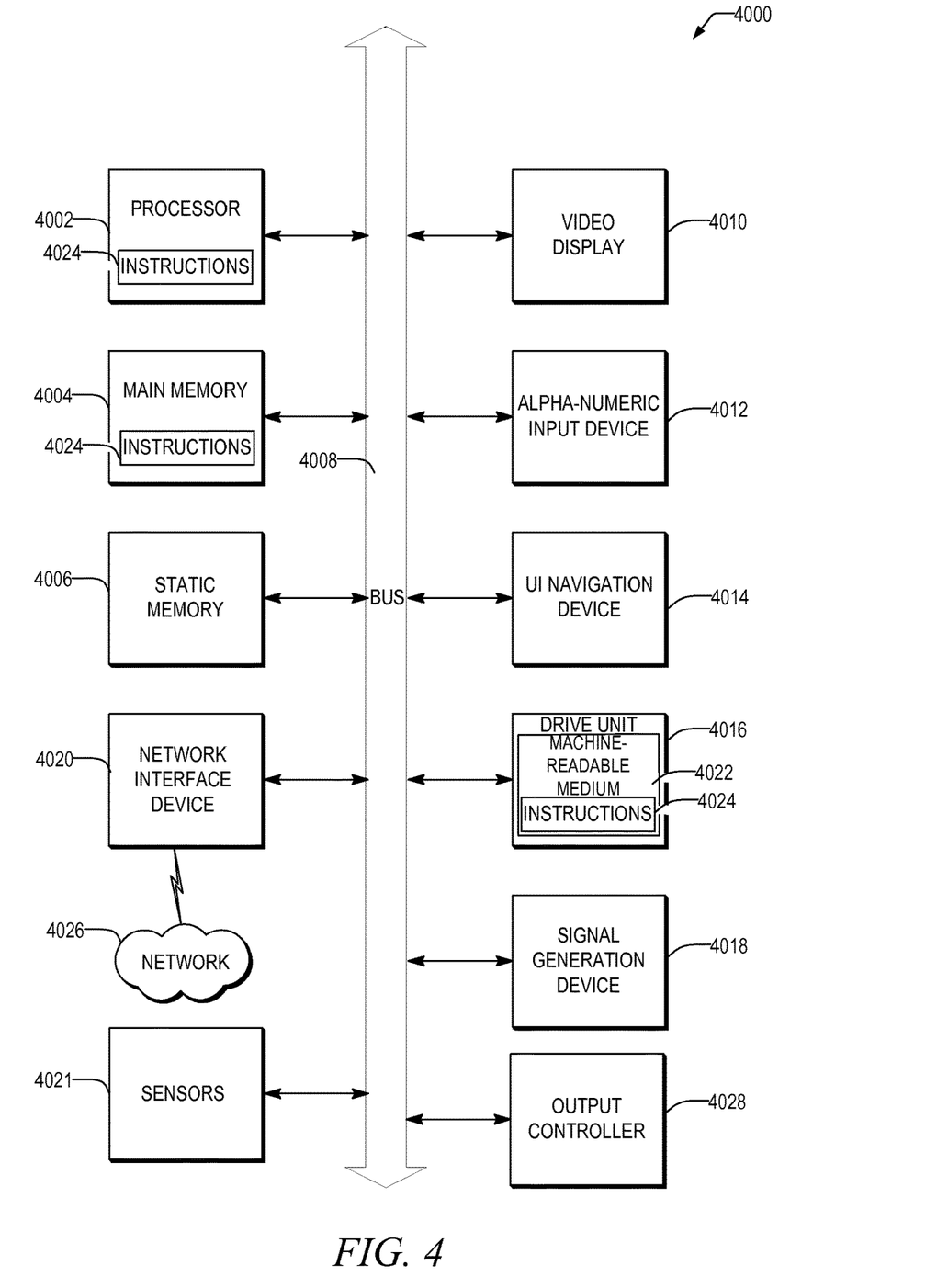
FIG. 4 is a block diagram illustrating an example of a machine upon which one or more embodiments may be implemented.

FIG. 4 illustrates a block diagram of an example machine 4000 upon which any one or more of the techniques (e.g., methodologies) discussed herein may be performed. In alternative embodiments, the machine 4000 may operate as a standalone device or may be connected (e.g., networked) to other machines. In a networked deployment, the machine 4000 may operate in the capacity of a server machine, a client machine, or both in server-client network environments. In an example, the machine 4000 may act as a peer machine in peer-to-peer (P2P) (or other distributed) network environment. The machine 4000 may be an ATM, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 4000 may include a hardware processor 4002 (e.g., a central processing unit (CPU), a graphics processing unit (GPU), a hardware processor core, or any combination thereof), a main memory 4004 and a static memory 4006, some or all of which may communicate with each other via an interlink (e.g., bus) 4008. The machine 4000 may further include a display unit 4010, an alphanumeric input device 4012 (e.g., a keyboard), and a user interface (UI) navigation device 4014 (e.g., a mouse). In an example, the display unit 4010, input device 4012 and UI navigation device 4014 may be a touch screen display. The machine 4000 may additionally include a storage device (e.g., drive unit) 4016, a signal generation device 4018 (e.g., a speaker), a network interface device 4020, and one or more sensors 4021, such as a global positioning system (GPS) sensor, compass, accelerometer, or other sensor. The machine 4000 may include an output controller 4028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4016 may include a machine readable medium 4022 on which is stored one or more sets of data structures or instructions 4024 (e.g., software) embodying or utilized by any one or more of the techniques or functions described herein. The instructions 4024 may also reside, completely or at least partially, within the main memory 4004, within static memory 4006, or within the hardware processor 4002 during execution thereof by the machine 4000. In an example, one or any combination of the hardware processor 4002, the main memory 4004, the static memory 4006, or the storage device 4016 may constitute machine readable media.

While the machine readable medium 4022 is illustrated as a single medium, the term "machine readable medium" may include a single medium or multiple media (e.g., a centralized or distributed database, and/or associated caches and servers) configured to store the one or more instructions 4024.

The term "machine readable medium" may include any medium that is capable of storing, encoding, or carrying instructions for execution by the machine 4000 and that cause the machine 4000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 4024 may further be transmitted or received over a communications network 4026 using a transmission medium via the network interface device 4020. The Machine 4000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4020 may include one or more physical jacks (e.g., Ethernet, coaxial, or phone jacks) or one or more antennas to connect to the communications network 4026. In an example, the network interface device 4020 may include a plurality of antennas to wirelessly communicate using at least one of single-input multiple-output (SIMO), multiple-input multiple-output (MIMO), or multiple-input single-output (MISO) techniques. In some examples, the network interface device 4020 may wirelessly communicate using Multiple User MIMO techniques.

What is claimed is:

1. A method for providing a graphical user interface; the method comprising:
   using one or more processors programmed to perform operations comprising:
   determining that a contextual user interface element should be displayed based upon context information of a user, the context information of the user comprising a current state of a graphical user interface of a network-based financial account management system, accounts the user is accessing, the user's physical location, the time of day, and a transaction the user was performing;
   responsive to determining that the contextual user interface element should be displayed, providing the contextual user interface element as part of the graphical user interface of the network-based financial account management system;
   receiving an indication that the contextual user interface element was activated by the user; and
   responsive to receiving the indication that the contextual user interface element was activated by the user:
   determining financial account information to display to the user;
   determining a financial performance improvement action to display to the user based upon at least one of: the financial account information; the context information of the user, and account rules for the network-based financial account management system; and
   providing a graphical user interface including the financial account information and the financial performance improvement action to the user.

2. The method of claim 1, wherein the financial account information is an interest rate of an interest bearing account of the user, the account managed by the network-based financial account management system.

3. The method of claim 2, wherein the financial performance improvement action is a recommendation to increase a balance of the interest bearing account of the user in order to increase an interest rate.

4. The method of claim 1, wherein determining that the contextual user interface element should be displayed comprises:
   determining that the user is likely to activate the contextual user interface element.

5. The method of claim 4, wherein determining that the user is likely to activate the contextual user interface element comprises:
   inputting the context information of the user into a machine-learned model.

6. The method of claim 1, wherein determining a financial performance improvement action to display to the user comprises:
   determining the financial performance improvement action by use of the at least one of: the financial account information, the context information of the user, and account rules for the network-based financial account management system as input into a predetermined set of rules.

7. The method of claim 1, wherein the contextual user interface element is a graphical button.

8. A system comprising:
   a processor;
   a computer readable medium having instructions stored thereon, which, when executed by the processor, cause the processor to perform the operations of:
   determining that a contextual user interface element should be displayed based upon context information of a user, the context information of the user comprising a current state of a graphical user interface of a network-based financial account management system, accounts the user is accessing, the user's physical location, the time of day, and a transaction the user was performing;
   responsive to determining that the contextual user interface element should be displayed, providing the contextual user interface element as part of the graphical user interface of the network-based financial account management system;
   receiving an indication that the contextual user interface element was activated by the user; and
   responsive to receiving the indication that the contextual user interface element was activated by the user:
   determining financial account information to display to the user;
   determining a financial performance improvement action to display to the user based upon at least one of: the financial account information, the context information of the user, and account rules for the network-based financial account management system; and
   providing a graphical user interface including the financial account information and the financial performance improvement action to the user.

9. The system of claim 8, wherein the financial account information is an interest rate of an interest hearing account of the user; the account managed by the network: based financial account management system.

10. The system of claim 9, wherein the financial performance improvement action is a recommendation to increase a balance of the interest bearing account of the user in order to increase an interest rate.

11. The system of claim 8, wherein the operations of determining that the contextual user interface element should be displayed comprises the operations of:
- determining that the user is likely to activate the contextual user interface element.

12. The system of claim 11, wherein the operations of determining that the user is likely to activate the contextual user interface element comprises the operations of:
- inputting the context information of the user into a machine-learned model.

13. The system of claim 8, wherein the operations of determining a financial performance improvement action to display to the user comprises the operations of:
- determining the financial performance improvement action by use of the at least one of: the financial account information, the context information of the user, and account rules for the network-based financial account management system as input into a predetermined set of rules.

14. The system of claim 8, wherein the contextual user interface element is a graphical button.

15. A non-transitory machine-readable medium, comprising instructions, which when performed by a machine, causes the machine to perform the operations of:
- determining that a contextual user interface element should be displayed based upon context information of a user, the context information of the user comprising a current state of a graphical user interface of a network-based financial account management system, accounts the user is accessing, the user's physical location, the time of day, and a transaction the user was performing;
- responsive to determining that the contextual user interface element should be displayed, providing the contextual user interface element as part of the graphical user interface of the network-based financial account management system;
- receiving an indication that the contextual user interface element was activated by the user; and
- responsive to receiving the indication that the contextual user interface element was activated by the user:
- determining financial account information to display to the user;
- determining a financial performance improvement action to display to the user based upon at least one of: the financial account information, the context information of the user, and account rules for the network-based financial account management system; and
- providing a graphical user interface including the financial account information and the financial performance improvement action to the user.

16. The machine-readable medium of claim 15, wherein the financial account information is an interest rate of an interest bearing account of the user, the account managed by the network-based financial account management system.

17. The machine-readable medium of claim 16, wherein the financial performance improvement action is a recommendation to increase a balance of the interest bearing account of the user in order to increase an interest rate.

18. The machine-readable medium of claim 15, wherein the operations of determining that the contextual user interface element should be displayed comprises the operations of:
- determining that the user is likely to activate the contextual user interface element.

19. The machine-readable medium of claim 18, wherein the operations of determining that the user is likely to activate the contextual user interface element comprises the operations of:
- inputting the context information of the user into a machine-learned model.

20. The machine-readable medium of claim 15, wherein the operations of determining a financial performance improvement action to display to the user comprises the operations of:
- determining the financial performance improvement action by use of the at leak one of: the financial account information, the context information of the user, and account rules for the network-based financial account management system as input into a predetermined set of rules.

21. The machine-readable medium of claim 15, wherein the contextual user interface element is a graphical button.

* * * * *

UNITED STATES PATENT AND TRADEMARK OFFICE
CERTIFICATE OF CORRECTION

PATENT NO. : 10,636,085 B1
APPLICATION NO. : 14/851039
DATED : April 28, 2020
INVENTOR(S) : Lovett et al.

Page 1 of 1

It is certified that error appears in the above-identified patent and that said Letters Patent is hereby corrected as shown below:

In the Claims

In Column 11, Line 33, in Claim 1, delete "interface;" and insert --interface,-- therefor In Column 11, Line 58, in Claim 1, delete "information;" and insert --information,-- therefor In Column 12, Line 61, in Claim 9, delete "hearing" and insert --bearing-- therefor In Column 12, Line 62, in Claim 9, delete "user;" and insert --user,-- therefor In Column 12, Line 62, in Claim 9, delete "network: based" and insert --network-based-- therefor In Column 14, Line 35, in Claim 20, delete "leak" and insert --least-- therefor Signed and Sealed this
Nineteenth Day of October, 2021

Drew Hirshfeld
*Performing the Functions and Duties of the
Under Secretary of Commerce for Intellectual Property and
Director of the United States Patent and Trademark Office*